United States Patent
Lee

(10) Patent No.: US 10,630,878 B2
(45) Date of Patent: Apr. 21, 2020

(54) SELF-PHOTOGRAPHING SYSTEM AND METHOD

(71) Applicant: GrassWonder Inc., Taipei (TW)

(72) Inventor: Ching-Kang Lee, Taipei (TW)

(73) Assignee: GRASSWONDER INC., Taipei (TW)

( * ) Notice: Subject to any disclaimer, the term of this patent is extended or adjusted under 35 U.S.C. 154(b) by 0 days.

(21) Appl. No.: 16/022,605

(22) Filed: Jun. 28, 2018

(65) Prior Publication Data

US 2018/0309924 A1 Oct. 25, 2018

Related U.S. Application Data

(62) Division of application No. 15/457,746, filed on Mar. 13, 2017, now Pat. No. 10,084,951.

(30) Foreign Application Priority Data

Feb. 16, 2017 (TW) .............................. 106105089 A

(51) Int. Cl.
*H04N 5/232* (2006.01)
*H04N 5/44* (2011.01)

(52) U.S. Cl.
CPC ..... *H04N 5/23203* (2013.01); *H04N 5/23293* (2013.01); *H04N 5/23299* (2018.08); *H04N 5/4403* (2013.01); *H04N 2005/4416* (2013.01)

(58) Field of Classification Search
CPC .................................................. H04N 5/23203
USPC ....................................................... 348/211.2
See application file for complete search history.

(56) References Cited

U.S. PATENT DOCUMENTS

| | | | | |
|---|---|---|---|---|
| 2009/0079812 A1* | 3/2009 | Crenshaw | ............... | H04N 7/142 348/14.01 |
| 2010/0157075 A1* | 6/2010 | Yoshizumi | ............... | G06K 9/209 348/211.9 |
| 2015/0207961 A1* | 7/2015 | Gavney, Jr. | ........... | G06K 9/3275 348/169 |

* cited by examiner

*Primary Examiner* — Joel W Fosselman
(74) *Attorney, Agent, or Firm* — Chun-Ming Shih

(57) ABSTRACT

The present invention provides a self-photographing system and method. The self-photographing system comprises an electronic device having a taking photo or recording video, and a self-photographing device. The electronic device is disposed on the self-photographing device. The self-photographing device comprises a controller, an infrared receiver and a rotating platform. The controller defines a first area from a signal sensing range of the infrared receiver. The controller controls the rotation of the rotating platform, so that the infrared receiver is able to receive the infrared signal in the first area of the signal sensing range, and therefore a lens of the electronic device can take photo or record video for the user in a particular angle.

6 Claims, 19 Drawing Sheets

SELF-PHOTOGRAPHING SYSTEM AND METHOD

CROSS-REFERENCE TO RELATED APPLICATIONS

This application is a Divisional of co-pending application Ser. No. 15/457,746, filed on Mar. 13, 2017, and for which priority is claimed under U.S.C. § 120; and this application claims priority of Application No. 106105089 filed in Taiwan, R.O.C. on Feb. 16, 2017 under 35 U.S.C. § 119(a); the entire contents of which are incorporated herein by reference.

FIELD OF THE INVENTION

The present invention relates to a self-photographing system and method, more particularly, to a system and method capable of tracking the infrared signal to implement self-photographing.

BACKGROUND

In the current consuming market, the smart phones have usually the self-photographing function to provide users to take photo or record video themselves. When the user is desired to take photo, he can use one hand to hold the smart phone, and press a photographing key and a video recoding key by a thumb so as to execute the self-photographing process. Afterwards, the selfie-stick is launched on the market, the user can dispose the smart phone into the selfie-stick to perform a self-photographing action in a better angle and a longer distance by the selfie-stick.

In traditional self-photographing way, the executing of the self-photographing process needs the user to hand hold the smart phone or the selfie-stick, which not only causes the inconvenience in the self-photographing operation, but the photoing postures of user will be limited.

For the reason, the present invention provides a novel self-photographing means, in which the user is able to implement self-photographing by tracking the infrared signal to increase the convenience in the self-photographing operation, it is the object to be achieved by the present invention.

SUMMARY

It is one object of the present invention to provide a self-photographing system, in which comprises an electronic device capable of taking photo or recording video, and a rotatable self-photographing device. The electronic device is disposed on the self-photographing device. The angles of taking photo or recording video of the lens of the electronic device are able to be changed by the rotating of the self-photographing device. The self-photographing device comprises a controller and an infrared receiver. The infrared receiver has a signal sensing range capable of sensing an infrared signal. The controller defines a first area from the signal sensing range, and controls the rotating of the self-photographing device so that the infrared receiver is able to receive the infrared signal in the first area. Therefore, the lens of the electronic device can take photo or record video for the user in a particular angle or position. Accordingly, the self-photographing system of the present invention is able to implement self-photographing by tracking the infrared signal to increase the convenience in the self-photographing operation.

It is another object of the present invention to provide a self-photographing system, in which an application program can be started on a display unit of the electronic device of the self-photographing system. A visual range of the lens of the electronic device is able to display on the display unit of the electronic device by the operation of the application program. A second area is defined from the visual range of the lens by the interface operation of the application program by the user. The electronic device computes an offset value between the first area and the second area, and transmits the offset value to the self-photographing device. Afterwards, the controller of the self-photographing device controls the rotating of the self-photographing device according to the offset value, so that an area where the infrared receiver desired to receive the infrared signal is adjusted from the first area to the second area.

It is another object of the present invention to provide a self-photographing system, in which further comprises a remote controller. An indicating signal containing an offset value will be generated by the user pressing at least one press key of the remote controller. After the self-photographing device receives the indicating signal, the controller of the self-photographing device controls the rotating of the self-photographing device according to the offset value indicated by the indicating signal so that an area where the infrared receiver desired to receive the infrared signal is adjusted from the first area to the second area.

For achieving above objects, the present invention provides a self-photographing system, comprising: an electronic device, being a device for taking photo or recording video, and comprising a lens; an infrared transmitter for transmitting at least one an infrared signal; and a self-photographing device comprising a controller, a rotating platform, and an infrared receiver, wherein the controller is connected to the rotating platform and the infrared receiver, the electronic device is disposed on the self-photographing device, and communicates with the self-photographing device, angles of taking photo or recording video of the lens of the electronic device are changed by the rotating of the rotating platform; wherein the infrared receiver has a signal sensing range capable of sensing the infrared signal, the controller defines a first area from the signal sensing range, and controls the rotating of the rotating platform so that the infrared receiver is able to receive the infrared signal in the first area.

In one embodiment of the present invention, wherein when the infrared receiver receives the infrared signal in an actual area within the signal sensing range, the controller computes an error value between the actual area and the first area, and controls the rotating of the rotating platform according to the error value, so that the infrared receiver is able to receive the infrared signal in the first area.

In one embodiment of the present invention, wherein the first area is a center area of the signal sensing range.

In one embodiment of the present invention, wherein the controller divided the signal sensing range of the infrared receiver into a plurality of reception points, the first area consists of part of the reception points.

In one embodiment of the present invention, wherein the electronic device further comprises a calculator, a display unit, and an application program, the calculator is connected to the lens and the display unit, the display unit is used for displaying a visual range of the lens, a second region is defined from the visual range of the lens by the application program, the calculator computes an offset value between the first area and the second area, and transmits the offset value to the self-photographing device, the controller of the self-photographing device controls the rotating of the rotating platform according to the offset value, so that an area where the infrared receiver desired to receive the infrared signal is adjusted from the first area to the second area.

In one embodiment of the present invention, wherein the self-photographing system further comprises a remote controller, the electronic device further comprises a signal receiver, the remote controller comprises a plurality of press keys, an indicating signal containing an offset value will be generated by pressing the press keys, the electronic device receives the indicating signal by the signal receiver and transmits the indicating signal to the self-photographing device, the controller of the self-photographing device controls the rotating of the rotating platform according to the offset value indicated by the indicating signal so that an area where the infrared receiver desired to receive the infrared signal is adjusted from the first area to the second area.

In one embodiment of the present invention, wherein the self-photographing system further comprises a remote controller, the self-photographing device further comprises a signal receiver, the controller is connected to the signal receiver, the remote controller comprises a plurality of press keys, an indicating signal containing an offset value will be generated by pressing the press keys, the self-photographing device receives the indicating signal by the signal receiver, the controller of the self-photographing device controls the rotating of the rotating platform according to the offset value indicated by the indicating signal so that an area where the infrared receiver desired to receive the infrared signal is adjusted from the first area to the second area.

In one embodiment of the present invention, wherein the rotating platform comprises the infrared receiver, the controller, and a motor, the controller is connected to the infrared receiver and the motor, the rotating platform is able to rotate by the controller controlling the operating of the motor.

In one embodiment of the present invention, wherein the self-timer system specifies a specific wavelength and a specific frequency for the infrared signal to be received, when the infrared receiver receives the infrared signal, the controller judges whether the infrared signal is transmitted from the infrared transmitter according to determine a wavelength and a frequency of the infrared signal.

In one embodiment of the present invention, wherein the infrared receiver is connected to a fisheye lens, and receives the infrared signal by the fisheye lens.

The present invention another provides a self-photographing method, which is applied in a self-photographing system, the self-photographing system comprising an electronic device capable of taking photo or recording video, a rotatable self-photographing device, and an infrared transmitter, the electronic device being disposed on the self-photographing device and having a lens, the self-photographing device comprising an infrared receiver and a controller, the infrared receiver having a signal sensing range capable of sensing an infrared signal, the steps of the self-photographing method comprising: defining a first area from the signal sensing range by the controller; transmitting the infrared signal by the infrared transmitter; controlling the rotating of the self-photographing device so that the infrared receiver is able to receive the infrared signal in the first area; and changing angles of taking photo or recording video of the lens of the electronic device following to the rotating of the self-photographing device.

In one embodiment of the present invention, further comprising the following steps: displaying a visual range of the lens on a display unit of the electronic device; defining a second region from the visual range of the lens by the application program; computing an offset value between the first area and the second area; transmitting the offset value to the self-photographing device by the electronic device; and executing the rotating of the self-photographing device according to the offset value so that an area where the infrared receiver desired to receive the infrared signal is adjusted from the first area to the second area.

In one embodiment of the present invention, wherein the self-photographing system further comprises a remote controller with a plurality of press keys, the self-photographing method further comprising the following steps: pressing the press keys of the remote controller to generate and transmit an indicating signal containing an offset value; receiving the indicating signal from the remote controller and transmitting the indicating signal to the self-photographing device by the electronic device; and executing the rotating of the self-photographing device according to the offset value so that an area where the infrared receiver desired to receive the infrared signal is adjusted from the first area to the second area.

In one embodiment of the present invention, wherein the self-photographing system further comprises a remote controller with a plurality of press keys, the self-photographing method further comprising the following steps: pressing the press keys of the remote controller to generate and transmit an indicating signal containing an offset value; receiving the indicating signal from the remote controller by the self-photographing device; and executing the rotating of the self-photographing device according to the offset value so that an area where the infrared receiver desired to receive the infrared signal is adjusted from the first area to the second area.

In one embodiment of the present invention, further comprising a step: determining whether a wavelength and a frequency of the infrared signal is equal to a specific wavelength and a specific frequency specified by the self-photographing system.

DETAILED DESCRIPTION OF THE PREFERRED EMBODIMENTS

Figure 1:
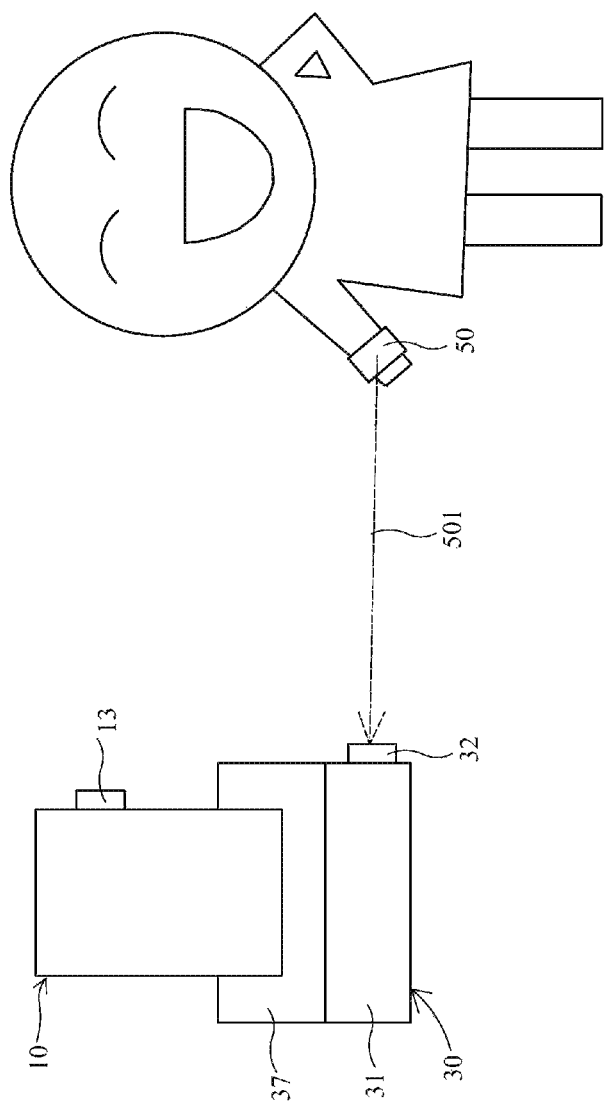
FIG. 1 is a structure diagram of a self-photographing system according to one embodiment of the present invention.
Figure 2:
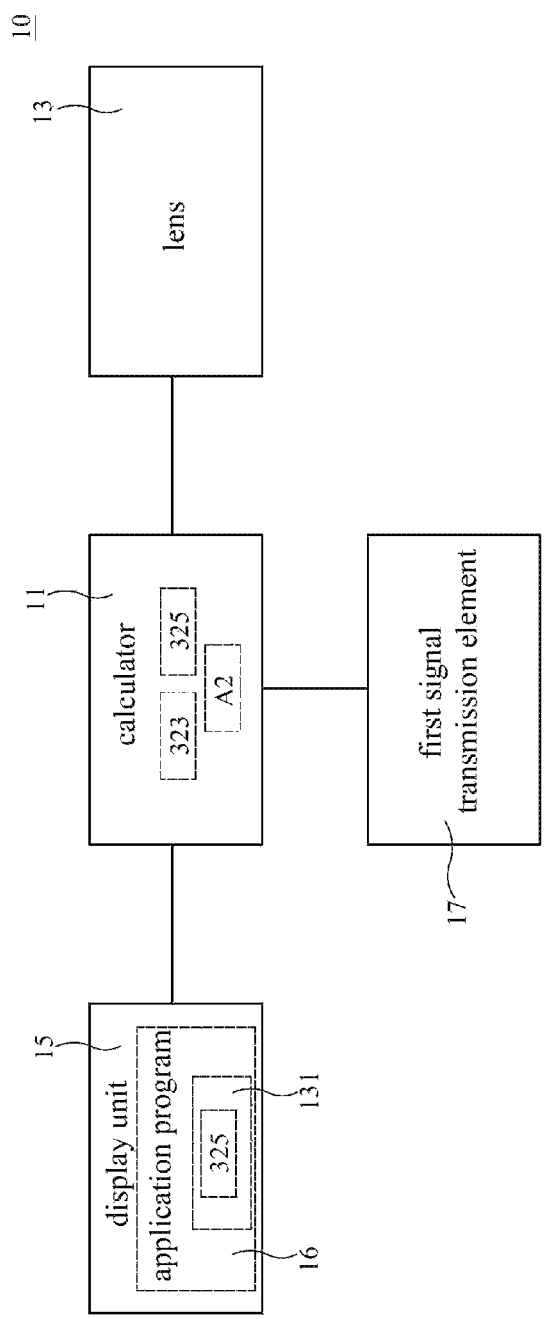
FIG. 2 is a circuit structure diagram of a electronic device according to one embodiment of the present invention.
Figure 3:
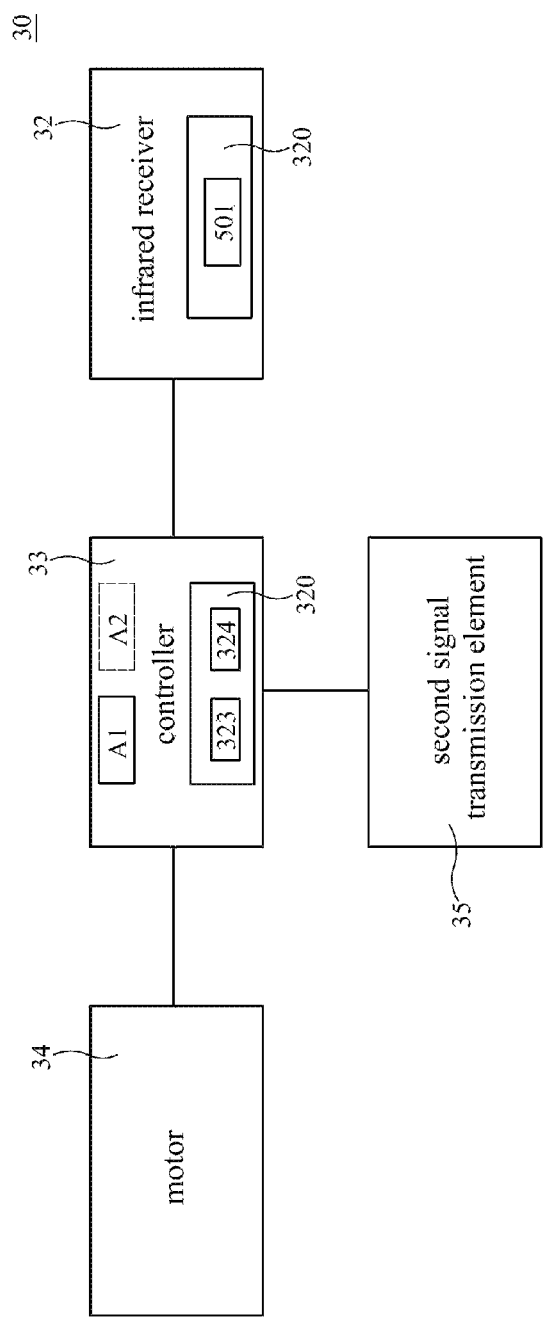
FIG. 3 is a circuit structure diagram of a self-photographing device according to one embodiment of the present invention.

Referring to FIG. 1, FIG. 2, and FIG. 3, there are shown a structure diagram of a self-photographing system according to one embodiment of the present invention, a circuit structure diagram of an electronic device according to one embodiment of the present invention, and a circuit structure diagram of a self-photographing device according to one embodiment of the present invention. As shown in FIG. 1, FIG. 2, and FIG. 3, the self-photographing system 100 of the present invention comprises an electronic device 10, a self-photographing device 30, and an infrared transmitter 50. The electronic device 10 is a device capable of taking photo or recording video. For example, the electronic device 10 is a smart phone, a tablet, or a camera. The self-photographing device 30 is a rotatable device. The electronic device 10 is disposed on the self-photographing device 30. The angles of taking photo or recording video of the lens of the electronic device 10 are changed by the rotating of the self-photographing device 30. The infrared transmitter 50 generates and transmits an infrared signal 501. The self-photographing system 100 of the present invention controls the rotating of the self-photographing device 30 by tracking the infrared signal 501.

The electronic device 10 comprises a calculator 11, a lens 13, a display unit 15, and a first signal transmission element 17. The calculator 11 is connected to the lens 13, the display unit 15, and the first signal transmission element 17. The self-photographing device 30 comprises a rotating platform 31 and a fixing seat 37. The fixing seat 37 is disposed on the rotating platform 31. The electronic device 10 is fixed on the rotating platform 31 of the self-photographing device 30 by the fixing seat 37.

The self-photographing device 30 further comprises an infrared receiver 32, a controller 33, a motor 34, and a second signal transmission element 35. The infrared receiver 32, the controller 33, the motor 34, and the second signal transmission element 35 are configured within the rotating platform 31. The controller 33 is connected to the infrared receiver 32, the motor 34, and the second signal transmission element 35. The motor 34 is a motor of a single shaft or double shaft. The electronic device 10 communicates with the self-photographing device 30 via the first signal transmission element 17 and the second signal transmission element 35. In one embodiment of the present invention, the first signal transmission element 17 and the second signal transmission element 35 are a wireless communication element or a wired transmission interface element, respectively. The rotating platform 31 can execute to rotate by the controller 33 controlling the operation of the motor 34. Thus, the angles of taking photo or recording video of the lens 13 of the electronic device 10 are changed by the rotating of the rotating platform 31.

The infrared receiver 32 of the self-photographing device 30 is a light receiving chip consisted of a plurality of light sensing elements. The infrared receiver 32 has a signal sensing range 320. The controller 33 defines a first area 323 from the signal sensing range 320. Besides, the controller 33 divided the signal sensing range 320 of the infrared receiver 32 into a plurality of reception points (M×N), for example, 4096×4096. The first area 323 consists of parts of the reception points. The first area 323 is an area of fixed size (such as an area consists of 50×50 reception points), or an area of adjustable size. In one embodiment of the present invention, the first area 323 is a center area of the signal sensing range 320. The controller 33 controls the rotating of the rotating platform 31 so that the infrared receiver 32 is able to receive the infrared signal 501 in the first area 323. In one embodiment of the present invention, the first area 323 is defined by a firmware within the self-photographing device 30. Otherwise, in another embodiment of the present invention, the first area 323 is defined by mobile phone or remote controller.

Figure 4:
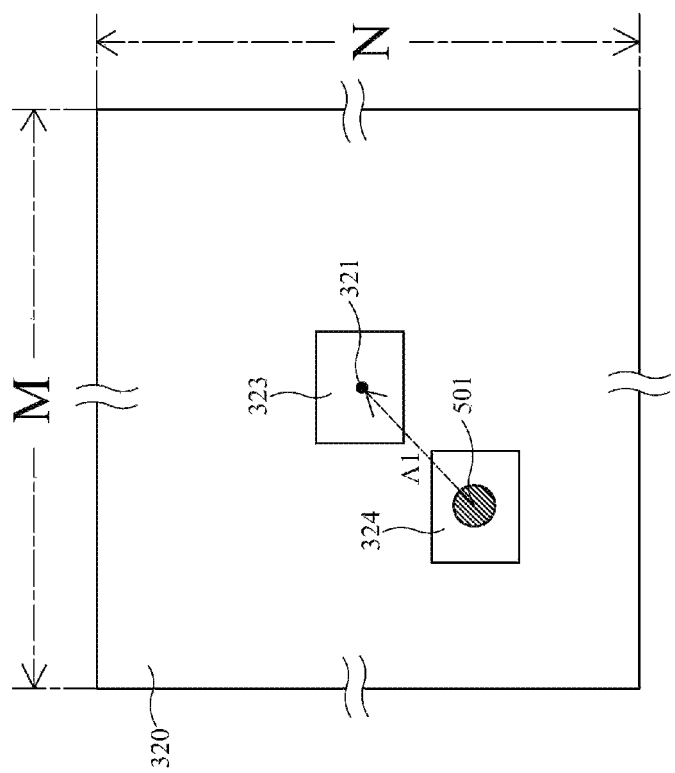
FIG. 4 is a schematic diagram of an infrared receiver of the present invention receiving an infrared signal in an actual area of a signal sensing range.
Figure 5:
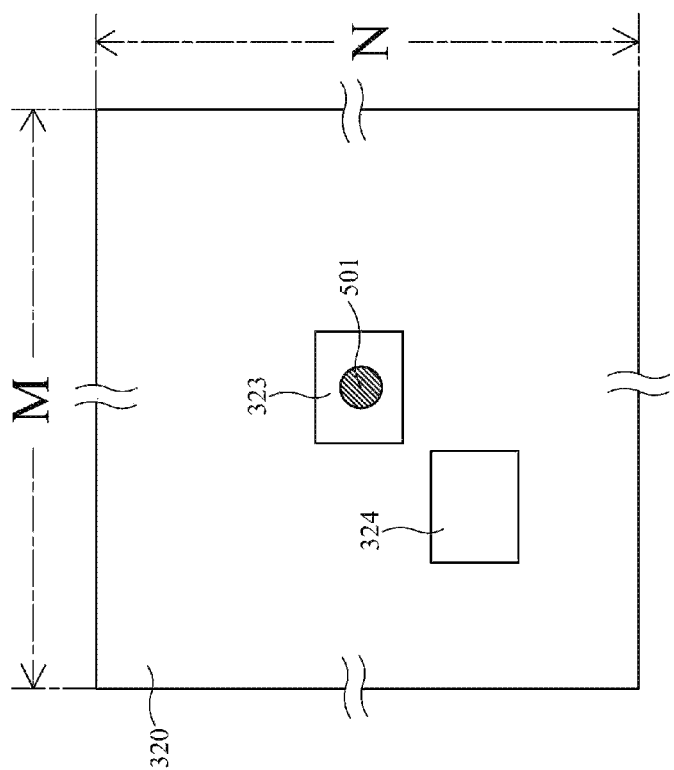
FIG. 5 is a schematic diagram of an infrared receiver of the present invention receiving an infrared signal in a first area of a signal sensing range.

Taking an example as an explanation, and simultaneous referring to FIG. 1, FIG. 2, FIG. 3, and FIG. 4. As shown in those Figures, when the self-photographing system 100 desires to execute the self-photographing and tracking process for the user's face, the infrared transmitter 50 will be worn on the user's body, for example, the infrared transmitter 50 is worn on the user's right hand. The infrared receiver 32 of the self-photographing device 30 may receive the infrared signal 501 transmitted from the infrared transmitter 50 in an actual area 324 within the signal sensing range 320. The self-photographing device 30 computes an error value A1 between the actual area 324 and the first area 323 by the controller 33. Afterwards, the controller 33 controls the motor 34 of the rotating platform 31 to rotate toward the upper right according to the error value A1 so that an area where the infrared receiver 32 receiving the infrared signal 501 is adjusted from the actual area 324 to the first area 323, as shown in FIG. 5. Thus, shooting angle of the lens 13 of the electronic device 10 can be corresponding adjusted to the upper right by the rotating of the rotating platform 31 so that the lens 13 of the electronic device 10 can take photo or record video for user' face.

Figure 6:
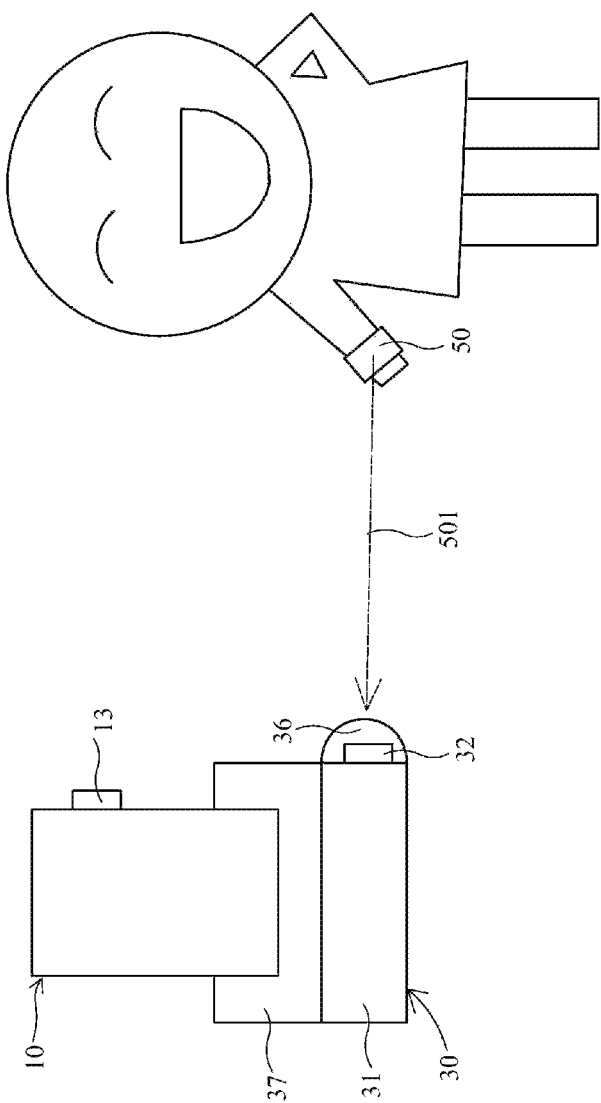
FIG. 6 is a structure diagram of a self-photographing system according to another embodiment of the present invention.

Referring to FIG. 6, there is shown a structure diagram of a self-photographing system according to another embodiment of the present invention. As shown in FIG. 6, the infrared receiver 32 is connected to a fisheye lens 36. The infrared receiver 32 receives the infrared signal 501 by the fisheye lens 36. By the disposition of the fisheye lens 36, the infrared receiver 32 is able to enlarge a viewing angle capable of sensing the infrared signal 501.

The above described embodiment, the area 323 of the center 321 of the signal sensing range 320 of the infrared receiver 32 is an area for receiving the infrared signal 501. Otherwise, an area for receiving the infrared signal 501 can be adjusted by the electronic device 10 or a remote controller used by user so that the infrared receiver 32 may select a non-central area as an area for receiving the infrared signal 501.

Figure 7:
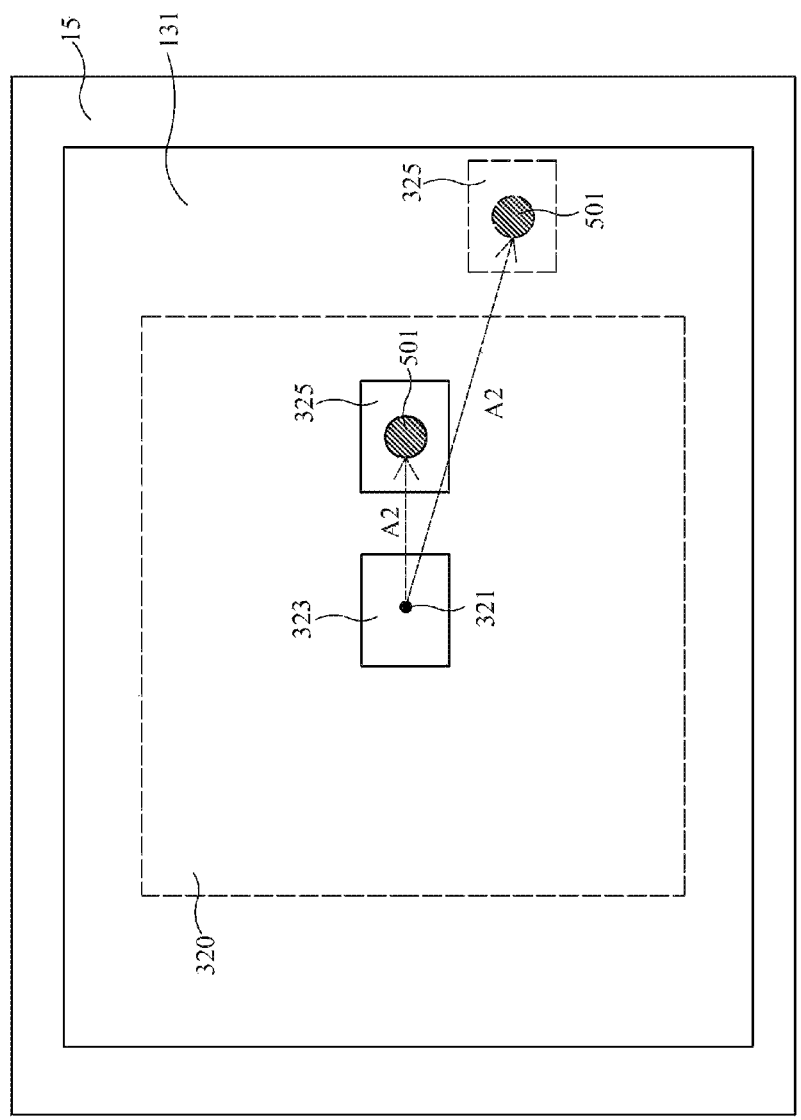
FIG. 7 is a schematic diagram of a visual range of a lens of the electronic device of the present invention.
Figure 8:
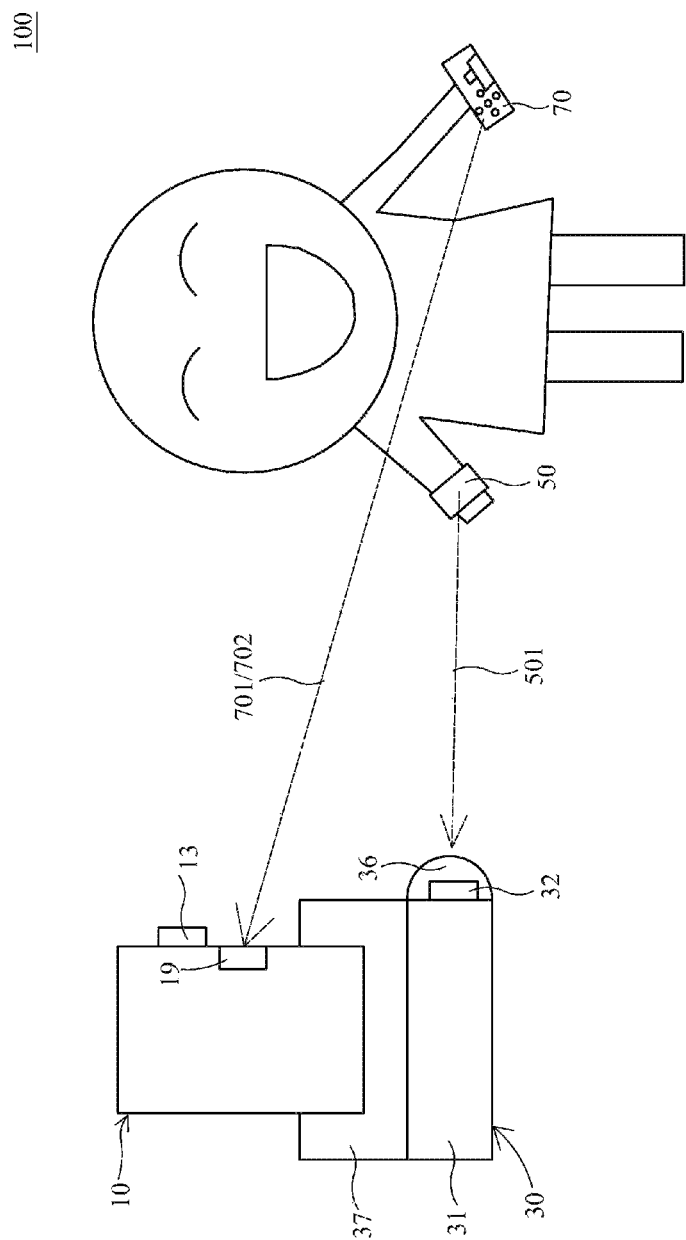
FIG. 8 is a structure diagram of a self-photographing system according to another embodiment of the present invention.
Figure 9:
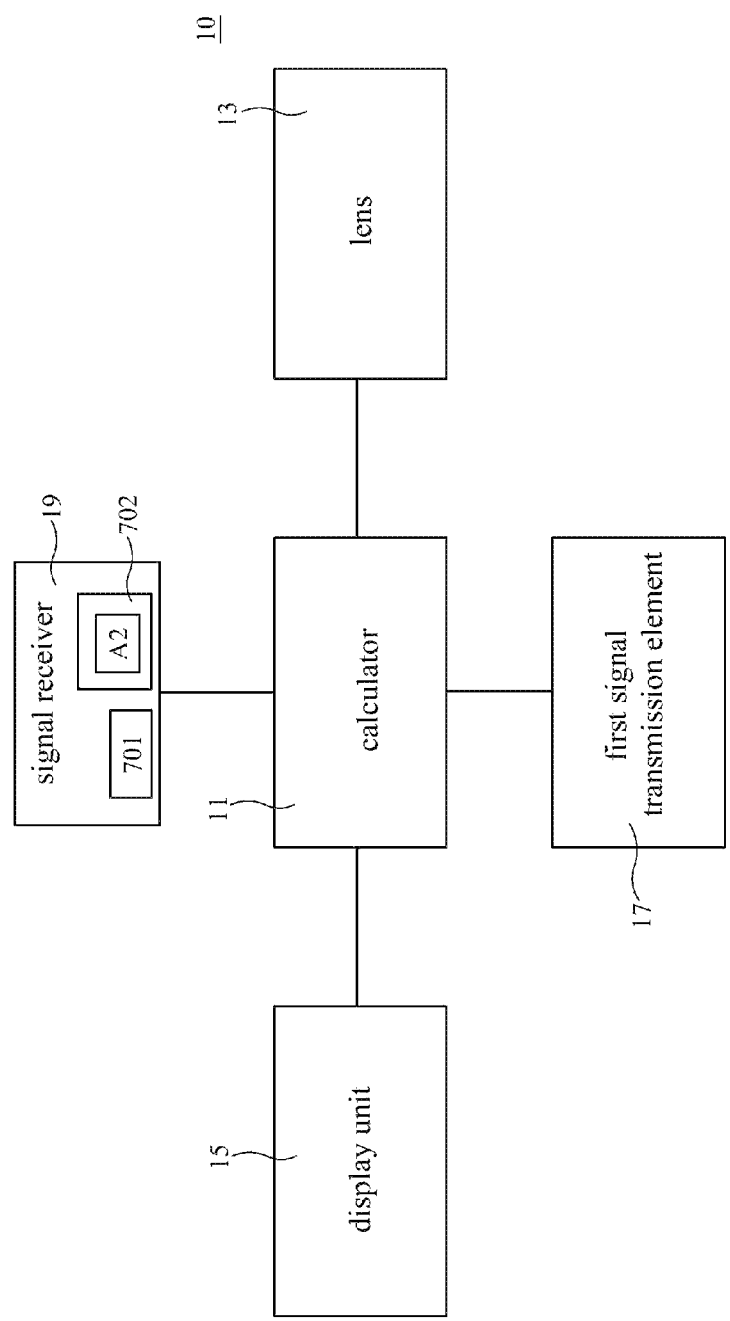
FIG. 9 is a circuit structure diagram of a electronic device according to another embodiment of the present invention.
Figure 10:
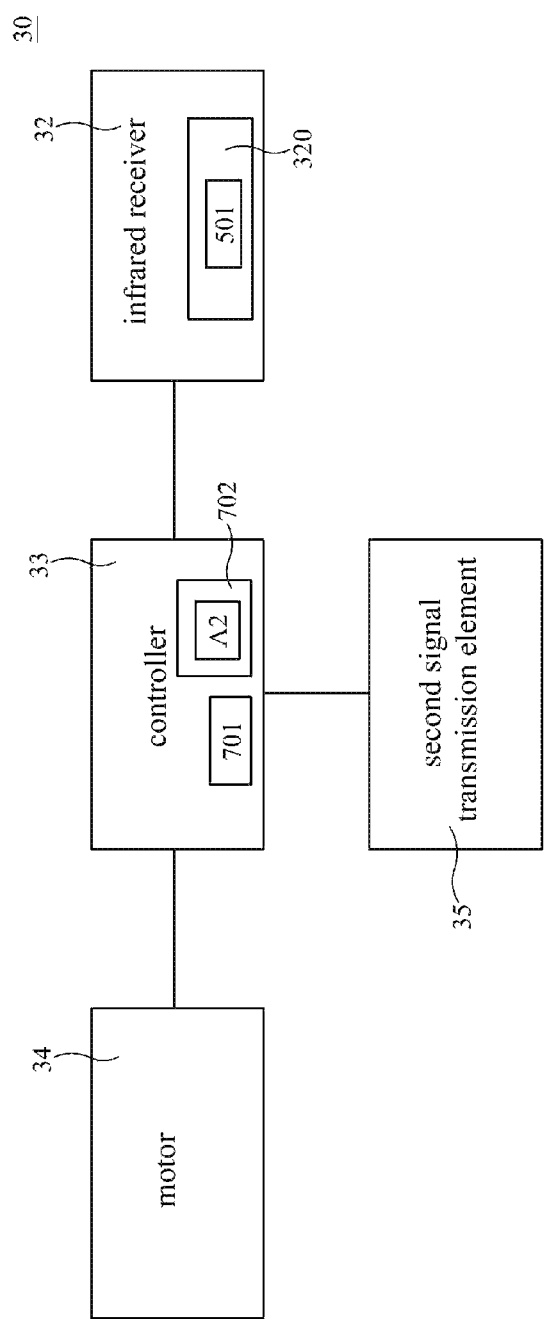
FIG. 10 is a circuit structure diagram of a self-photographing device according to another embodiment of the present invention.
Figure 11:
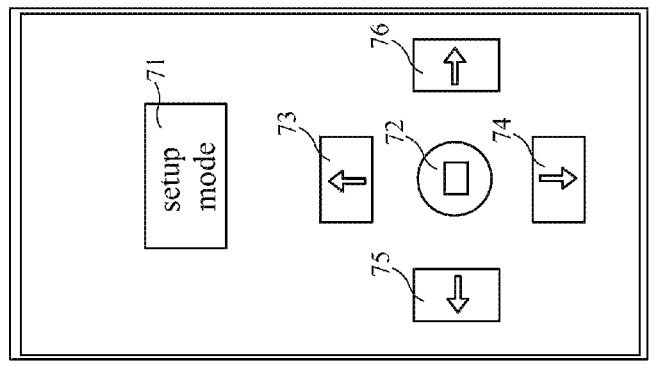
FIG. 11 is a structure diagram of a remote controller according to one embodiment of the present invention.

In one embodiment of the present invention, an area for the infrared receiver 32 receiving the infrared signal 501 can be adjusted by the electronic device 10 used by user. As shown in FIG. 2, FIG. 3, FIG. 6, and FIG. 7, the electronic device 10 further comprises an application program 16. A visual range 131 of the lens 13 of the electronic device 10 will be displayed on the display unit 15 of the electronic device 10. A second region 325 is defined from the visual range 131 of the lens 13 by the interface operation of the application program 16. The calculator 11 of the electronic device 10 computes an offset value A2 between the first area 323 and the second area 325, and transmits the offset value A2 to the self-photographing device 30. The controller 33 of the self-photographing device 30 controls the rotating of the rotating platform 31 according to the offset value A2, so that an area where the infrared receiver 32 desired to receive the infrared signal 501 is adjusted from the first area 323 to the second area 325, as shown in FIG. 7. Thus, shooting angle of the lens 13 of the electronic device 10 can be corresponding adjusted to the right by the rotating of the rotating platform 31 so that the lens 13 of the electronic device 10 can take photo or record video for user's face and use's right background contents. For example, the self-photographing system 100 is applied in a report scene, the lens 13 of the electronic device 10 can take photo or record video for the reporter and the report contents appeared on the reporter's right wall. In one embodiment of the present invention, the second area 325 is defined within the original signal sensing range 320 of the infrared receiver 32. In another embodiment of the present invention, the second area 325 is defined outside the original signal sensing range 320 of the infrared receiver 32. Otherwise, in another embodiment of the present invention, the second area 325 is defined in the edge of the original signal sensing range 320 of the infrared receiver 32.

In another embodiment of the present invention, an area for the infrared receiver 32 receiving the infrared signal 501 can be adjusted by a remote controller used by user. Referring to FIG. 8, FIG. 9, FIG. 10, and FIG. 11, there are shown a structure diagram of a self-photographing system according to another embodiment of the present invention, a circuit structure diagram of a electronic device according to another embodiment of the present invention, a circuit structure diagram of a self-photographing device according to another embodiment of the present invention, and a structure diagram of a remote controller according to one embodiment of the present invention. As shown in these figures, the self-photographing system 100 further comprises a remote controller 70, and the electronic device 10 further comprises a signal receiver 19 connected to the calculator 11. The signal receiver 19 is used for receiving at least one wireless signal transmitted from the remote controller 70. The remote controller 70 and the signal receiver 19 are the devices conforming to the Bluetooth transmission specification, the RF transmission specification, the infrared transmission specification, or other wireless transmission specifications. The remote controller 70 comprises a plurality of press key 71~76. When the user desires to define the area for receiving the infrared signal 501, firstly, pressing the press key 71 of a setup mode to enter the setup mode. If the user desires to define the center area of the signal sensing range 320 as the area for receiving the infrared signal 501, the remote controller 70 will generate an indicating signal 701, which indicates the center area as the area for receiving the infrared signal 501, by pressing the middle press key 72, and transmit the indicating signal 701 to the electronic device 10. The electronic device 10 receives the indicating signal 701 by the signal receiver 19, and transmits the indicating signal 701 to the self-photographing device 30 by the first signal transmission element 17. The self-photographing device 30 receives the indicating signal 701 by the second signal transmission element 35. Afterwards, the controller 33 of the self-photographing device 30 will define the first area 323 located within the center 321 of the signal sensing range 320 as the area for receiving the infrared signal 501, as shown in FIG. 4.

Figure 12:
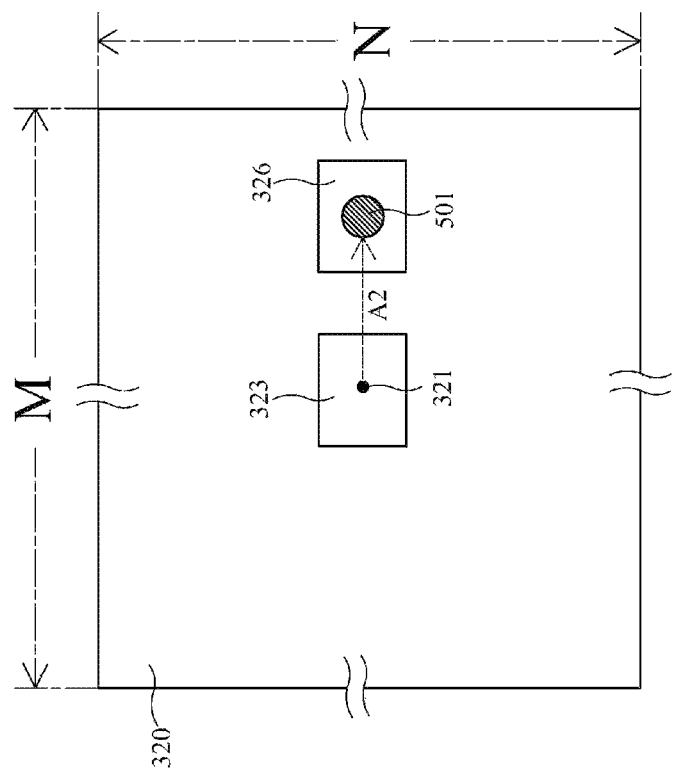
FIG. 12 is a schematic diagram of an infrared receiver of the present invention receiving an infrared signal in a second area of the visual range.

On the contrary, if the user desires to adjust the area for receiving the infrared signal 501, an indicating signal 702 containing an offset value A2 will be generated by pressing at least once direction press key 73, 74, 75, and/or 76, and then the remote controller 70 transmits the indicating signal 702 to the electronic device 10. The electronic device 10 receives the indicating signal 702 by the signal receiver 19, and transmits the indicating signal 702 to the self-photographing device 30 by the first signal transmission element 17. The self-photographing device 30 receives the indicating signal 702 by the second signal transmission element 35. The controller 33 of the self-photographing device 30 controls the rotating of the motor 34 of the rotating platform 31 according to the offset value A2 indicated in the indicating signal 702, so that an area where the infrared receiver 32 desired to receive the infrared signal 501 is adjusted from the first area 323 to the second area 326, as shown in FIG. 12. In one embodiment of the present invention, besides, the infrared transmitter 50 and a remote controller 70 can be integrated into a single device.

In one embodiment of the present invention, similarly, the second area 326 is defined within the original signal sensing range 320 of the infrared receiver 32. In another embodiment of the present invention, the second area 326 is defined outside the original signal sensing range 320 of the infrared receiver 32. Otherwise, in another embodiment of the present invention, the second area 326 is defined in the edge of the original signal sensing range 320 of the infrared receiver 32.

Figure 13:
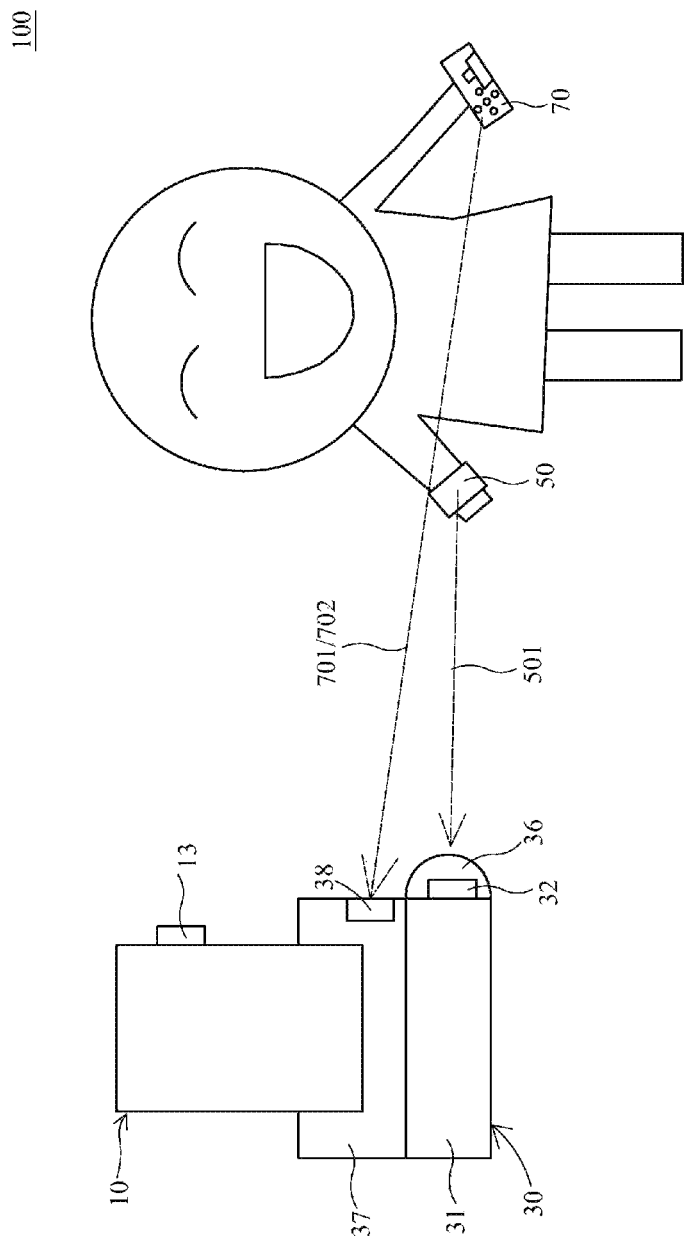
FIG. 13 is a structure diagram of a self-photographing system according to another embodiment of the present invention.
Figure 14:
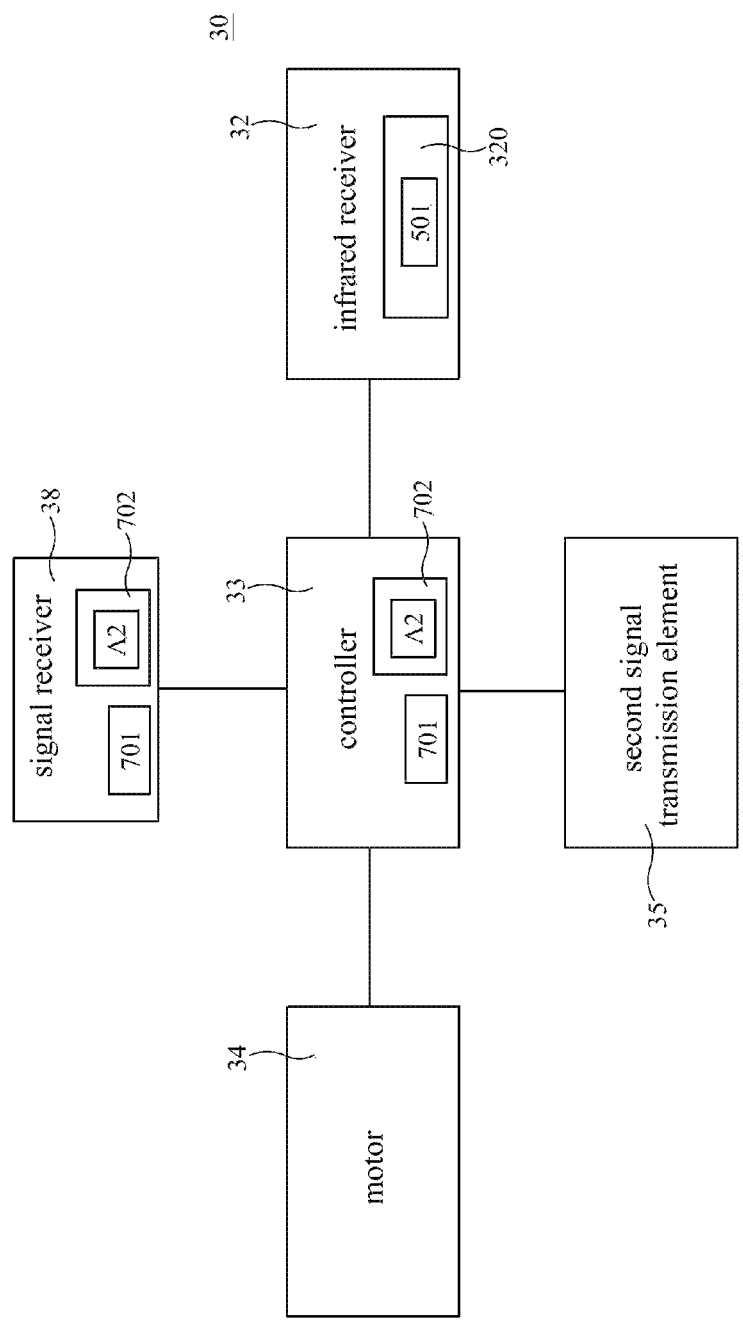
FIG. 14 is a circuit structure diagram of a self-photographing device according to another embodiment of the present invention.

Referring to FIG. 13 and FIG. 14, there are shown a structure diagram of a self-photographing system according to another embodiment of the present invention, and a circuit structure diagram of a self-photographing device according to another embodiment of the present invention. In the present embodiment, the signal receiver 38 for receiving the signal transmitted from the remote controller 70 can be selectively configured within the self-photographing device 30. The signal receiver 38 is connected to the controller 33. The self-photographing device 30 receives the indicating signal 701/702 transmitted from the remote controller 70. Thus, the controller 33 of the self-photographing device 30 will define the first area 323 located within the center 321 of the signal sensing range 320 as the area for receiving the infrared signal 501 according to the indication of the indicating signal 701, as shown in FIG. 4. Otherwise, the controller 33 of the self-photographing device 30 controls the rotating of the motor 34 of the rotating platform 31 according to the offset value A2 indicated in the indicating signal 702, so that the area where the infrared receiver 32 desired to receive the infrared signal 501 is adjusted from the first area 323 to the second area 326, as shown in FIG. 12.

Accordingly, the self-photographing system 100 of the present invention defines or adjusts the area 323/325/326 where the infrared receiver 32 desired to receive the infrared signal 501 according to the objects (such as user's body parts and/or background contents) to be self-photographed or application scene, and therefore the lens 13 of the electronic device 10 can take photo or record video for objects to be self-photographed in a particular angle or position. In the above described embodiment, the self-photographing system 100 executes the self-photographing and tracking process for the user; otherwise, the self-photographing system 100 can also execute the self-photographing and tracking process for other movable objects, for example, self-photographing and tracking for pets.

In another embodiment of the present invention, the self-timer system 100 specifies a specific wavelength and a specific frequency of the infrared signal 501 to be received. When the infrared receiver 32 receives the infrared signal 501, the controller 33 judges whether the wavelength and the frequency of the infrared signal 501 is equal to the specific wavelength and the specific frequency specified by the self-photographing system 100. If the wavelength and the frequency of the infrared signal 501 is equal to the specific wavelength and the specific frequency specified by the self-photographing system 100, the self-photographing system 100 will execute the rotating operation of the self-photographing device 30; or else, the rotating operation of the self-photographing device 30 will be inhibited. By the specification of the wavelength and the frequency of the infrared signal 501, it is possible to avoid an unpredictable infrared signal, for example, an infrared signal generated by fluorescent lamp, to interfere the operation of the self-photographing system 100.

The infrared transmitter 50 has a plurality of light emitting elements, for example, LED. Each of light emitting elements can emit an infrared signal 501. Thus, the infrared receiver 32 receives a plurality of infrared signals 501 (such as nine infrared signals 501) at different angles. The infrared receiver 32 will take the infrared signal with the largest spot and the brightest luminance as the target to be tracked and received.

Figure 15:
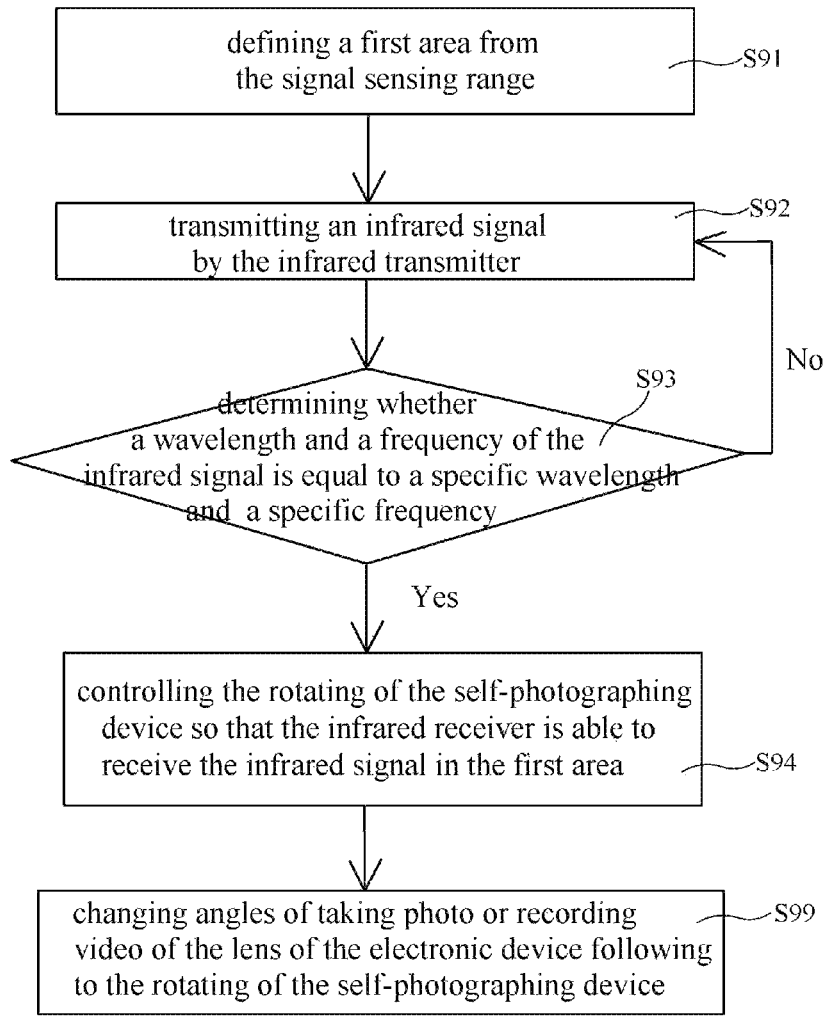
FIG. 15 is a flow chart of a self-photographing method according to one embodiment of the present invention.

Referring to FIG. 15, there is shown a flow chart of a self-photographing method according to one embodiment of the present invention. As shown in FIG. 15, in step S91, the controller 33 of the self-photographing device 30 defines a first area 323 from the signal sensing range 320 of the infrared receiver 32. In step S92, the infrared transmitter 50 transmits an infrared signal 501. In step S94, the controller 33 controls the rotating of the motor 34 of the self-photographing device 30 so that the infrared receiver 32 is able to receive the infrared signal 501 in the first area 323. In step S99, angles of taking photo or recording video of the lens 13 of the electronic device 10 is able to be changed following to the rotating of the self-photographing device 30.

Before step S94 is executed, further comprises a step S93. In the step S93, the infrared receiver 32 determines whether a wavelength and a frequency of the infrared signal 501 is equal to a specific wavelength and a specific frequency specified by the self-photographing system 100. If the wavelength and the frequency of the infrared signal 501 is equal to the specific wavelength and the specific frequency specified by the self-photographing system 100, the self-photographing system 100 will execute the rotating operation of the self-photographing device 30; or else, the wavelength and the frequency of the infrared signal 501 is not equal to the specific wavelength and the specific frequency specified by the self-photographing system 100, the rotating operation of the self-photographing device 30 will be inhibited.

Figure 16:
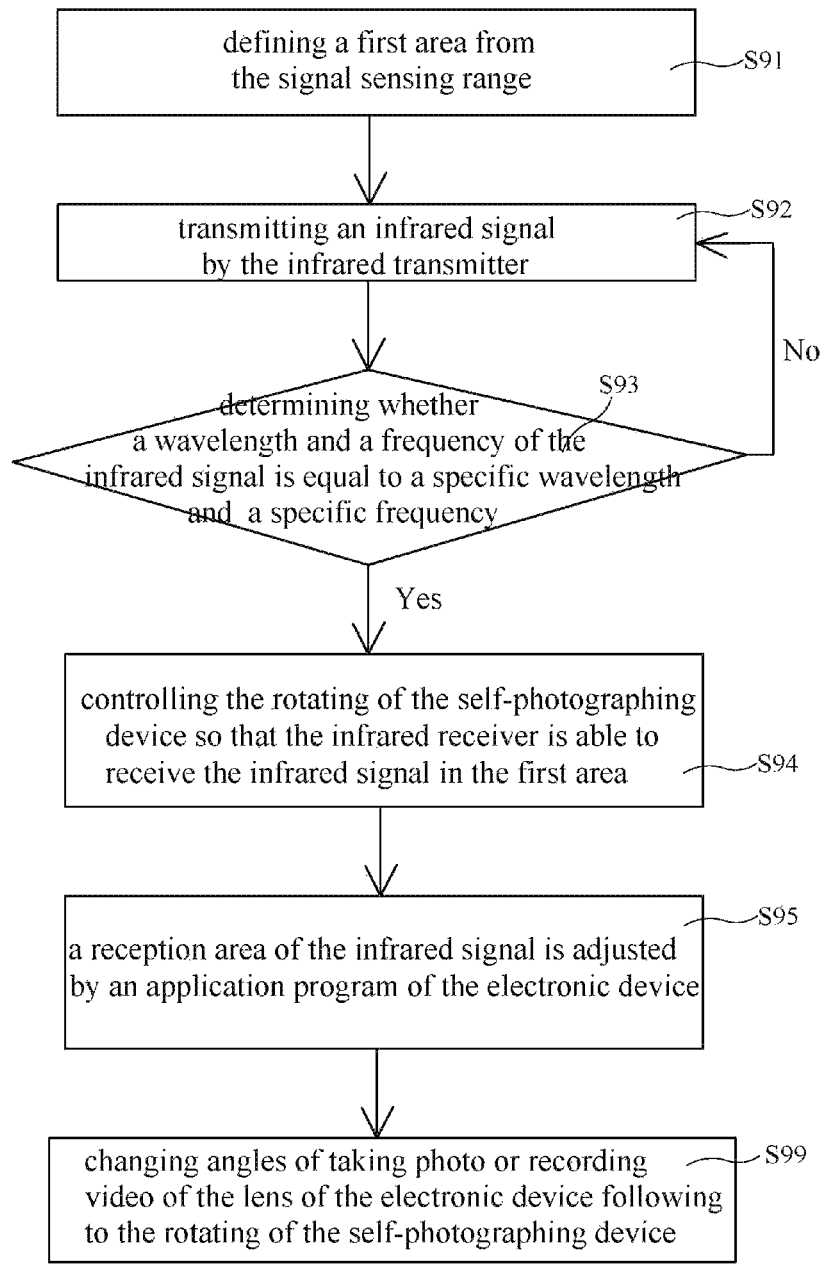
FIG. 16 is a flow chart of a self-photographing method according to another embodiment of the present invention.
Figure 17:
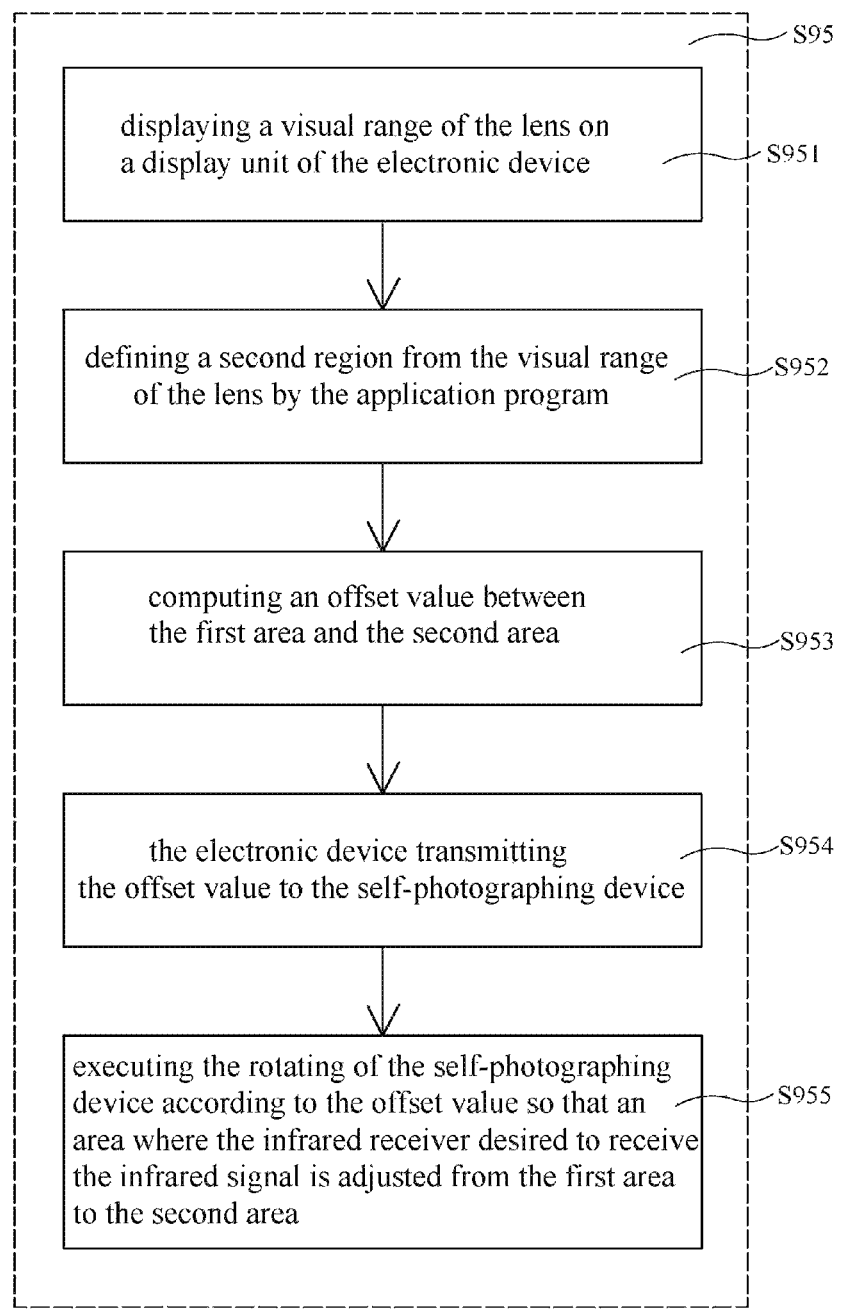
FIG. 17 is a flow chart of a reception area of the infrared signal adjusted by an application program of the electronic device according to one embodiment of the present invention.

Referring to FIG. 16 and FIG. 17, there are shown a flow chart of a self-photographing method according to another embodiment of the present invention, and a flow chart of a reception area of the infrared signal adjusted by an application program of the electronic device according to one embodiment of the present invention. Comparing to the embodiment of FIG. 15, the self-photographing method of the present invention further comprises a step process S95 for adjusting the reception area of the infrared signal 501 by the application program of the electronic device. The step process S95 is executed, firstly, in the step S951, a visual range 131 of the lens 13 is displayed on a display unit 15 of the electronic device 10. In the step S952, a second region 325 is defined from the visual range 131 of the lens 13 by the interface operation of the application program 16. In the step S953, the electronic device 10 computes an offset value A2 between the first area 323 and the second area 325. In the step S954, the electronic device 10 transmits the offset value A2 to the self-photographing device 30. In the step S955, the self-photographing device 30 executes to rotate according to the offset value A2 so that an area where the infrared receiver 32 desired to receive the infrared signal 501 is adjusted from the first area 323 to the second area 325, as shown in FIG. 7.

Figure 18:
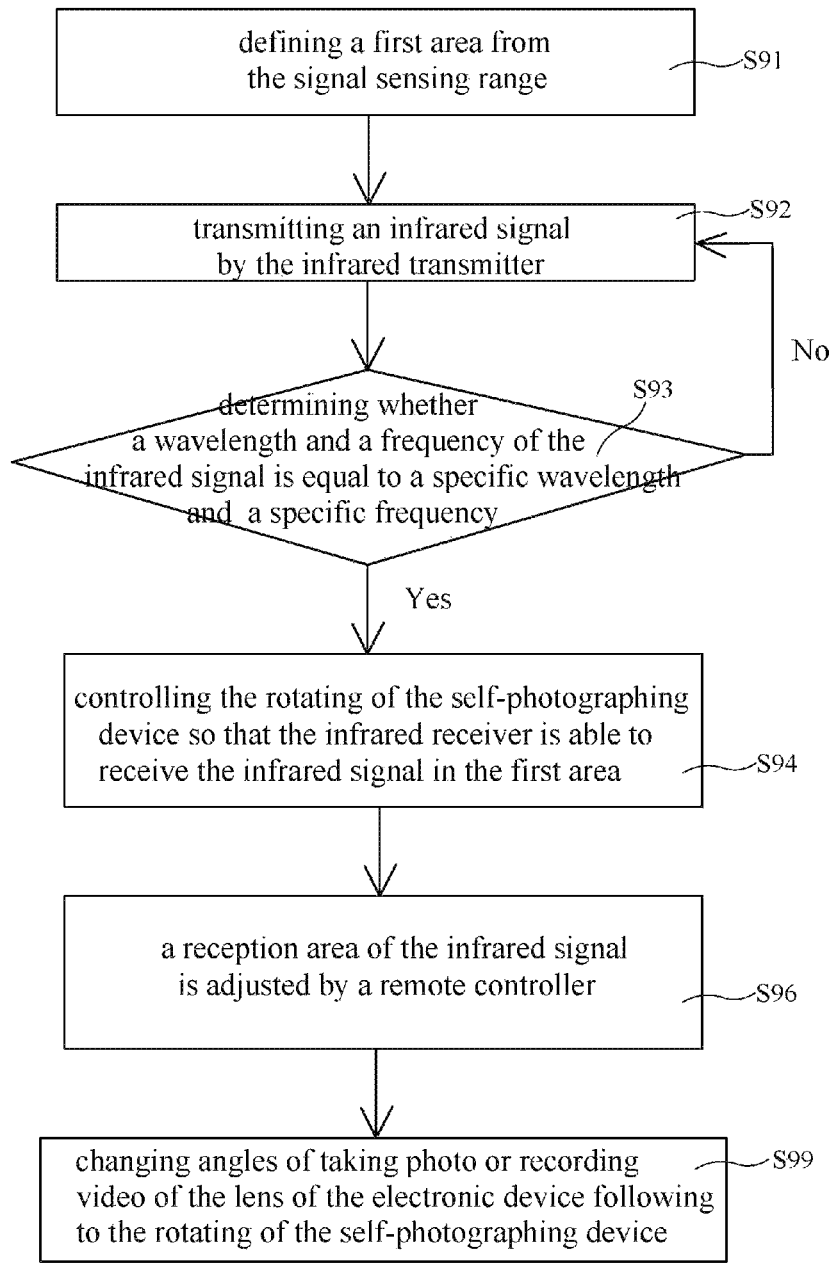
FIG. 18 is a flow chart of a self-photographing method according to another embodiment of the present invention.
Figure 19:
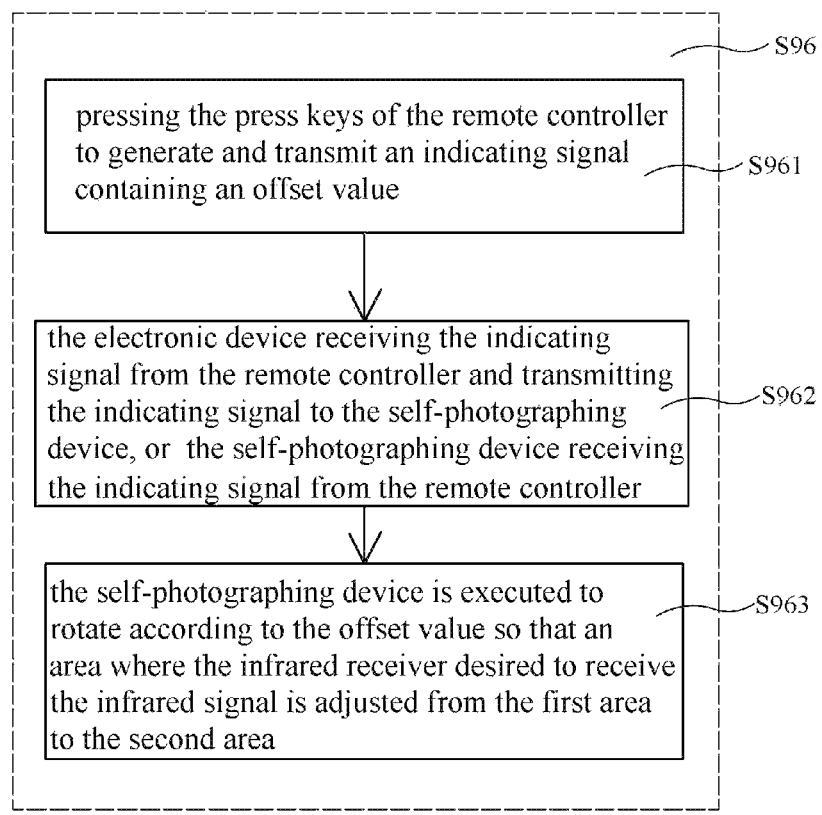
FIG. 19 is a flow chart of a reception area of the infrared signal adjusted by a remote controller according to one embodiment of the present invention.

Referring to FIG. 18 and FIG. 19, there are shown a flow chart of a self-photographing method according to another embodiment of the present invention, and a flow chart of a reception area of the infrared signal adjusted by a remote controller according to one embodiment of the present invention. Comparing to the embodiment of FIG. 15, the self-photographing method of the present invention further comprises a step process S96 for adjusting the reception area of the infrared signal 501 by the remote controller 70. The step process S96 is executed, firstly, in the step S961, the press keys 72, 73, 74, 75, and/or 76 of the remote controller are pressed to generate and transmit an indicating signal 702 containing an offset value A2. In the step S962, the electronic device 10 receives the indicating signal 702 from the remote controller 70 and transmitting the indicating signal 702 to the self-photographing device 30, or the self-photographing device 30 receives the indicating signal 702 from the remote controller 70, directly. In the step S963, the self-photographing device 30 executes to rotate according to the offset value A2 so that an area where the infrared receiver 32 desired to receive the infrared signal 501 is adjusted from the first area 323 to the second area 326, as shown in FIG. 12.

Summed up the above description, the self-photographing system 100 of the present invention is able to implement self-photographing by tracking the infrared signal 501 to increase the convenience in the self-photographing operation.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

The invention claimed is:
1. A self-photographing system, comprising:
an electronic device, being a device for taking photo or recording video, and comprising a lens;
an infrared transmitter for transmitting at least one an infrared signal; and a self-photographing device comprising a controller, a rotating platform, an infrared receiver and a signal receiver, wherein the controller is connected to the rotating platform, the infrared receiver, and the signal receiver, the electronic device is disposed on the self-photographing device and communicates with the self-photographing device, angles of taking photo or recording video of the lens of the electronic device are changed by the rotating of the rotating platform; and a remote controller comprising a plurality of press keys;

wherein the infrared receiver has a signal sensing range capable of sensing the infrared signal, the controller defines a first area from the signal sensing range, and controls the rotating of the rotating platform so that the infrared receiver is able to receive the infrared signal in the first area;

wherein an indicating signal containing an offset value will be generated by pressing the press keys of the remote controller, the self-photographing device receives the indicating signal by the signal receiver, the controller of the self-photographing device controls the rotating of the rotating platform according to the offset value indicated by the indicating signal so that an area where the infrared receiver desired to receive the infrared signal is adjusted from the first area to the second area;

wherein the self-timer system specifies a specific wavelength and a specific frequency of the infrared signal to be received, when the infrared receiver receives the infrared signal, the controller judges whether the infrared signal is transmitted from the infrared transmitter according to determine a wavelength and a frequency of the infrared signal.

2. The self-photographing system according to claim 1, wherein the first area is a center area of the signal sensing range.

3. The self-photographing system according to claim 1, wherein the controller divided the signal sensing range of the infrared receiver into a plurality of reception points, the first area consists of parts of the reception points.

4. The self-photographing system according to claim 1, wherein the rotating platform comprises the infrared receiver, the controller, and a motor, the controller is connected to the infrared receiver and the motor, the rotating platform is able to rotate by the controller controlling the operation of the motor.

5. The self-photographing system according to claim 1, wherein the infrared receiver is connected to a fisheye lens, and receives the infrared signal by the fisheye lens.

6. A self-photographing method, which is applied in a self-photographing system, the self-photographing system comprising an electronic device capable of taking photo or recording video, a rotatable self-photographing device, and an infrared transmitter, the electronic device being disposed on the self-photographing device and communicating with the self-photographing device, the electronic device comprising a lens, the self-photographing device comprising an infrared receiver and a controller, the infrared receiver having a signal sensing range capable of sensing an infrared signal, the steps of the self-photographing method comprising:

defining a first area from the signal sensing range by the controller;

transmitting the infrared signal by the infrared transmitter;

controlling the rotating of the self-photographing device so that the infrared receiver is able to receive the infrared signal in the first area;

changing angles of taking photo or recording video of the lens of the electronic device following to the rotating of the self-photographing device;

pressing the press keys of the remote controller to generate and transmit an indicating signal containing an offset value;

demanding the self-photographing device to directly receive the indicating signal from the remote controller or demanding the self-photographing device to receive the indicating signal from the remote controller via the electronic device; and determining whether a wavelength and a frequency of the infrared signal is equal to a specific wavelength and a specific frequency specified by the self-photographing system; and executing the rotating of the self-photographing device according to the offset value indicated by the indicating signal so that an area where the infrared receiver desired to receive the infrared signal is adjusted from the first area to the second area.

* * * * *